US009524014B2

(12) United States Patent
Lindahl et al.

(10) Patent No.: US 9,524,014 B2
(45) **Date of Patent: *Dec. 20, 2016**

(54) MEDIA PLAYBACK POWER MANAGEMENT DEVICES AND METHODS

(71) Applicant: Apple Inc., Cupertino, CA (US)

(72) Inventors: Aram Lindahl, Menlo Park, CA (US); Saurabh Gupta, Sunnyvale, CA (US); Wang Chun Leung, San Jose, CA (US); Richard Michael Powell, Mountain View, CA (US); Joseph M. Williams, Dallas, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,131

(22) Filed: Jan. 4, 2016

(65) Prior Publication Data

US 2016/0195914 A1 Jul. 7, 2016

Related U.S. Application Data

(63) Continuation of application No. 12/970,468, filed on Dec. 16, 2010, now Pat. No. 9,256,275.

(60) Provisional application No. 61/379,208, filed on Sep. 1, 2010.

(51) Int. Cl.

*G06F 3/00* (2006.01)
*G06F 5/00* (2006.01)
*G06F 1/32* (2006.01)
*G06F 5/14* (2006.01)

(52) U.S. Cl.

CPC ............. *G06F 1/324* (2013.01); *G06F 1/3215* (2013.01); *G06F 1/3225* (2013.01); *G06F 1/3234* (2013.01); *G06F 1/3275* (2013.01); *G06F 5/14* (2013.01); *Y02B 60/1217* (2013.01); *Y02B 60/1228* (2013.01); *Y02B 60/32* (2013.01)

(58) Field of Classification Search

None

See application file for complete search history.

(56) References Cited

U.S. PATENT DOCUMENTS

| | | | |
|---|---|---|---|
| 5,412,519 A | 5/1995 | Buettner et al. | |
| 6,347,380 B1 | 2/2002 | Chang et al. | |
| 6,388,588 B2 | 5/2002 | Kitamura | |
| 6,842,864 B1 | 1/2005 | Barth et al. | |
| 7,280,156 B2 | 10/2007 | Roelens | |
| 7,548,585 B2 * | 6/2009 | Kent, Jr. | H04L 29/06027 375/240.25 |

(Continued)

*Primary Examiner* — Elias Mamo

(74) *Attorney, Agent, or Firm* — Blakely, Sokoloff, Taylor & Zafman LLP

(57) ABSTRACT

Devices and methods for power management during media playback are provided. For example, an electronic device according to an embodiment may include storage, a decoder, an output buffer, and data processing circuitry. The storage may store compressed media data that may be decoded by the decoder. The output buffer may store the decoded media data before the decoded media data is played out. The data processing circuitry configured may measure a fullness of the output buffer and may set an operating frequency of the storage, the decoder, the output buffer, or the data processing circuitry, or a combination thereof, depending on a format of the compressed media data and the fullness of the output buffer.

20 Claims, 9 Drawing Sheets

(56) References Cited

U.S. PATENT DOCUMENTS

| | | | | |
|---|---|---|---|---|
| 7,596,488 | B2 | 9/2009 | Florencio et al. | |
| 7,639,706 | B2 * | 12/2009 | Hamada | H04L 29/06027 370/230 |
| 2001/0055253 | A1 * | 12/2001 | Bresit | G11B 19/125 369/47.41 |
| 2015/0286242 | A1 * | 10/2015 | Keidar | G06F 1/08 713/600 |

* cited by examiner

96

| CLOCK SETTING | FORMAT 1 | FORMAT 2 | FORMAT 3 | FORMAT 4 | FORMAT 5 |
|---|---|---|---|---|---|
| 0 | | | A | A | A |
| 1 | | A | | | B |
| 2 | A | | B | B | C |
| 3 | B | B | | C | |
| 4 | C | C | C | | |

200
98

| CLOCK SETTING | RADIO FORMAT |
|---|---|
| 0 | A |
| 1 | B |
| 2 | |
| 3 | |
| 4 | |

MEDIA PLAYBACK POWER MANAGEMENT DEVICES AND METHODS

CROSS-REFERENCE TO RELATED APPLICATIONS

This application is a continuation of co-pending U.S. application Ser. No. 12/970,468 filed on Dec. 16, 2010 which claims benefit of Provisional Application Ser. No. 61/379,208, filed Sep. 1, 2010, entitled "MEDIA PLAYBACK POWER MANAGEMENT DEVICES AND METHODS," which is incorporated by reference herein in its entirety.

BACKGROUND

The present disclosure relates generally to power management for an electronic device during media playback and, more particularly, to power management depending on a format of the media and a fullness of an output buffer.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices are capable of playing back digital media, such as digital audio or video, of a variety of different media formats. Popular media formats include AAC, ALAC, AAC-HE, MP3, among others, which may offer compression of data with minimal loss of information. To play back media encoded under such formats, an electronic device first may decode the media into a playable form before storing the decoded data in a media output buffer. The decoded media may be played out to a user as the decoded media data is gradually read out of the output buffer. Although the decoded media data may fill the media output buffer at a relatively variable rate, the decoded media data may be played back from the media output buffer at a relatively constant rate.

To improve power efficiency and/or battery life of an electronic device while media is being played back, a variety of techniques for power management have been developed. For example, since operating the electronic device at a lower clock speed may reduce power consumption but slow the process of filling the media output buffer, some techniques may involve setting the clock speed to a low clock speed when the media output buffer exceeds a threshold, and setting the clock speed to a high clock speed when the media output buffer falls below the threshold. Since certain media formats may require more or fewer processing resources, to prevent unintentional underruns of the media output buffer, the above technique only may apply when media of certain relatively non-resource-intense media formats are being played back. When relatively resource-intense media formats are played back, only the maximum clock speed may be applied. While applying the maximum clock speed may prevent media output buffer underruns, doing so also may consume additional resources.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for power management during media playback. For example, an electronic device according to an embodiment may include storage, a decoder, an output buffer, and data processing circuitry. The storage may store compressed media data that may be decoded by the decoder. The output buffer may store the decoded media data before the decoded media data is played out. The data processing circuitry configured may measure a fullness of the output buffer and may set an operating frequency of the storage, the decoder, the output buffer, or the data processing circuitry, or a combination thereof, depending on a format of the compressed media data and the fullness of the output buffer.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTIONS OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
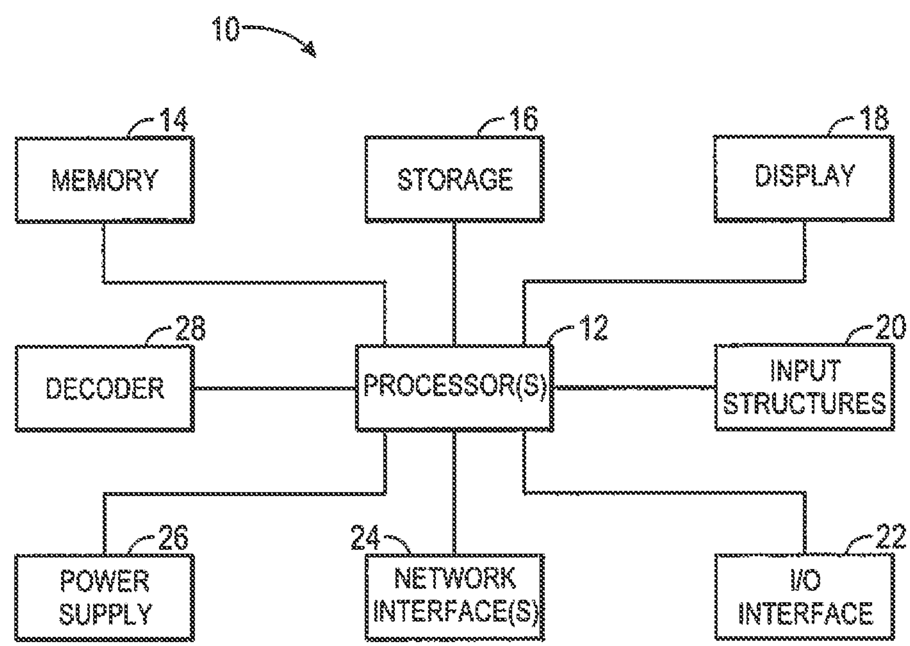
FIG. 1 is a schematic block diagram of an electronic device capable of power management based at least partly on the format of media being played back, in accordance with an embodiment.
Figure 3:
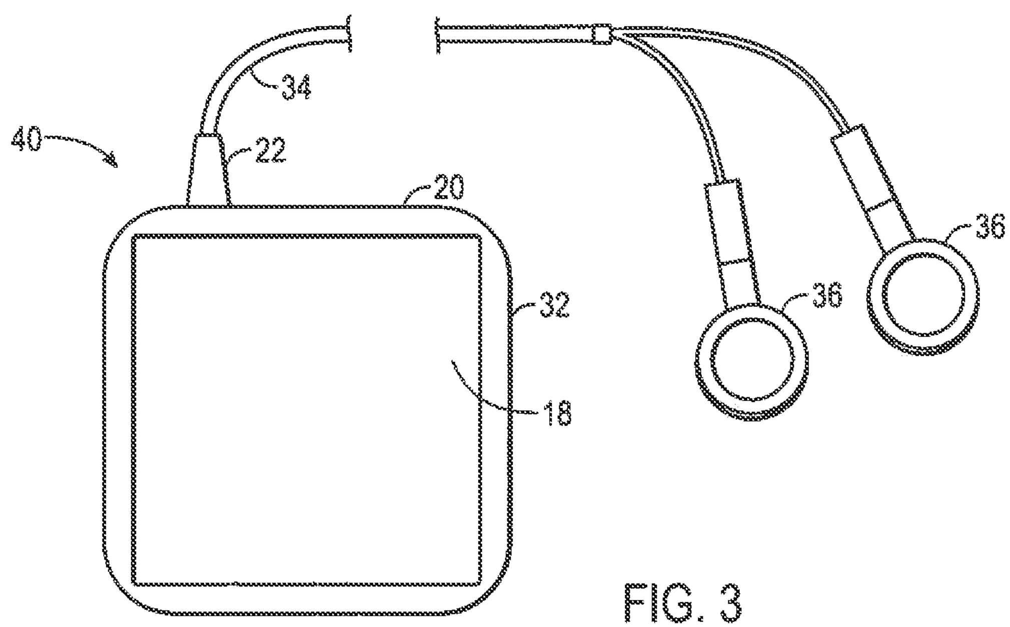
FIG. 3 is a perspective view of the electronic device of FIG. 1 in the form of a compact media player, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Many electronic devices include media playback functionalities, such as audio or video playback. In general, media playback may involve obtaining a compressed or encoded media file, decoding part of the file, and loading that part of the file into an output buffer. The output buffer may gradually deplete as the decoded media data is output for playback. At various times, another part of the media file may be decoded and placed into the output buffer. Since the decoded media data may fill the media output buffer at a relatively variable rate, but the decoded media data may be played back from the media output buffer at a relatively constant rate, "filling" the media output buffer may be asynchronous to the read out of the media output buffer.

During media playback, an electronic device may not necessarily employ all of its processing resources. Accordingly, present embodiments relate to techniques for power management during such media playback by reducing one or more clocks of the electronic device when doing so will not cause the media output buffer to underrun. Specifically, such techniques involve varying the clock setting based in part on the fullness of the output buffer, the format of the media that is being played back, and/or an amount of resources requested by other tasks being performed by the processor. Specifically, a format-specific clock selection profile may indicate a particular clock setting depending on the specific format of the media being played back and a fullness of the media output buffer, while a CPU idle time may indicate a particular clock setting needed for a processor of the electronic device to perform its current task. In some embodiments, the electronic device may apply the higher of either the lowest clock setting indicated by a format-specific clock selection protocol associated with the current media format and output buffer fullness, and the lowest clock setting indicated for a given CPU idle time.

As used herein, the term "format-specific clock selection profile" refers to a profile relating a specific media format being played back and a fullness of the output buffer, which indicates a format-specific set of clock settings respectively associated with certain fullness levels of the output buffer. For example, the media output buffer of an electronic device may be divided into one or more thresholds of fullness. A format-specific clock selection profile may indicate a format-specific set of clock settings respectively associated with the various thresholds.

The use of format-specific clock selection profiles may ensure that the clock setting associated with each threshold is not fixed for all media formats, but rather varies from media format to media format according to the various format-specific clock selection profiles. For a less resource-intensive media format (e.g., AAC), a format-specific clock selection profile may respectively associate the various thresholds with generally lower clock frequencies. By contrast, for a relatively more resource-intensive media format (e.g., AAC-HE), a format-specific clock selection profile may respectively associate the various thresholds with generally higher clock frequencies. That is, rather than map the set of thresholds respectively to the same set of clock frequencies regardless of media format, each of the thresholds respectively may map to different clock frequencies depending on the media format being played back according to the various format-specific clock selection profiles. By way of example, for a relatively low-resource-intensity format, a format-specific clock selection profile may map a first threshold to a first of five possible clock settings, a second threshold to a second of five possible clock settings, and a third threshold to a third of five possible clock setting. For a relatively higher-resource-intensity format, a format-specific clock selection profile may map the first threshold to the second of five possible clock settings, the second threshold to the third of five possible clock settings, and a third threshold to a fifth of five possible clock settings.

For some embodiments, other resource-draining tasks currently undertaken by a processor of the electronic device also may be considered. Specifically, during certain media playback operations, the processor may be employed not only to control the media playback process but also to perform some media-enhancing processes (e.g., audio equalization). The use of these additional resources may result in less media data being decoded and placed into the output buffer than otherwise when operating at a given clock setting. Thus, in some embodiments, the electronic device may apply the higher of a clock setting needed by the processor and the clock setting implicated by the threshold level of fullness in the output buffer.

Variations of these embodiments are also envisaged. By way of example, in some embodiments, regardless of media format, each of the threshold levels may map respectively to a single clock setting. However, the precise locations of the thresholds in the audio buffer may vary depending on the media format being played back. That is, threshold levels for a first audio format may be spaced approximately equally through the output buffer, while threshold levels for a second audio format may have a different spacing (e.g., the threshold levels may be higher or lower in the output buffer, as appropriate). It should also be appreciated that the examples described above and below are provided by way of example only. In particular, although the embodiments described below generally describe audio playback, any suitable media playback may benefit from the present techniques. Finally, it should be understood that the various techniques described herein may be carried out by components of "data processing circuitry," which may be embodied wholly or in part as software, firmware, hardware, or any combination thereof. Furthermore, such data processing circuitry may be a single contained processing module or may be incorporated wholly or partially within any of the other elements within electronic device. In general, the term "component" refers to hardware, software, and/or firmware that, alone or in combination, perform a particular function.

With the foregoing in mind, FIG. 1 represents a block diagram of an electronic device 10 configured to perform the present techniques for media-format-based power management. Among other things, the electronic device 10 may include processor(s) 12, memory 14, nonvolatile storage 16, a display 18, input structures 20, an input/output (I/O) interface 22, network interface(s) 24, a power source 26, and/or a media decoder 28. The various functional blocks shown in FIG. 1 may represent hardware, software, and/or firmware elements. It should be noted that FIG. 1 is merely one example of a particular implementation and is intended to illustrate the types of components that may be present in the electronic device 10.

In general, the processor(s) 12 may govern the operation of the electronic device 10. In the electronic device 10 of FIG. 1, the processor(s) 12 may be operably coupled with the memory 14 and the nonvolatile storage 16 to perform certain programs or instructions for carrying out the presently disclosed techniques. Such programs or instructions executed by the processor(s) 12 may be stored in any suitable article of manufacture that includes one or more tangible, computer-readable media at least collectively storing the instructions or routines, such as the memory 14 and the nonvolatile storage 16. The article(s) of manufacture may include, for example, the memory 14 and/or the nonvolatile storage 16. The memory 14 and the nonvolatile storage 16 may include any suitable articles of manufacture for storing data and executable instructions, such as random-access memory, read-only memory, rewritable flash memory, hard drives, and optical discs.

The display 18 may be a flat panel display, such as a liquid crystal display (LCD). Additionally, the display 18 may represent one of the input structures 20. Specifically, the display 18 may serve as a capacitive-touch-sensitive display capable of detecting projected capacitive touch (PCT) touch input gestures. By way of example, the display 18 may have a Multi-Touch™ interface, and may be capable of detecting such touch input gestures as a "swipe," "hold," and/or certain touch input gestures involving more than one simultaneous touch. Other input structures 20 may include, for example, keys, buttons, and/or switches. The I/O ports 22 of the electronic device 10 may enable the electronic device 10 to transmit data to and receive data from other electronic devices 10 and/or various peripheral devices, such as external keyboards or mice. The network interface(s) 24 may enable personal area network (PAN) integration (e.g., Bluetooth), local area network (LAN) integration (e.g., Wi-Fi), and/or wide area network (WAN) integration (e.g., 3G). In some embodiments, the network interface(s) 24 also may include a broadcast radio receiver to enable reception of streaming audio, such as FM radio audio. The power source 26 of the electronic device 10 may be any suitable source of power, such as a rechargeable lithium polymer (Li-poly) battery and/or alternating current (AC) power converter. A media decoder 28 may decode certain encoded media data into data playable on the electronic device. The media decoder 28 may be a dedicated hardware media decoder or may be a software media decoder running on the processor(s) 12.

Figure 2:
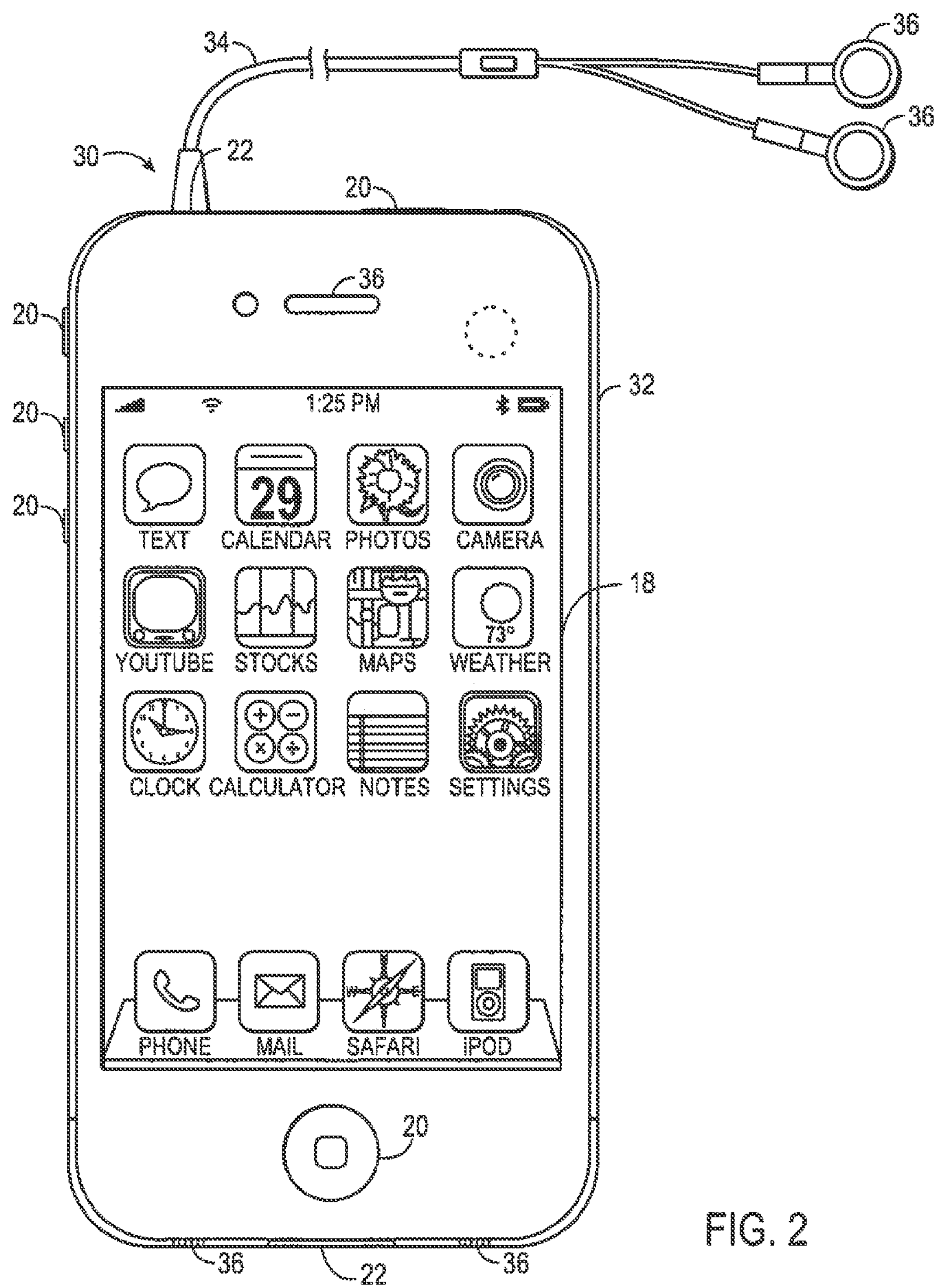
FIG. 2 is a perspective view of the electronic device of FIG. 1 in the form of a handheld device, in accordance with an embodiment.

FIG. 2 illustrates an electronic device 10 in the form of a handheld device 30. The handheld device 30 may incorporate the functionality of one or more types of devices, such as a media player, a cellular phone, a gaming platform, a personal data organizer, and so forth. By way of example, the handheld device 30 may be a model of an iPod® or iPhone® available from Apple Inc. of Cupertino, Calif.

The handheld device 30 may include an enclosure 32 or body that protects the interior components from physical damage and shields them from electromagnetic interference. The enclosure 32 may be formed from any suitable material, such as plastic, metal or a composite material, and may allow certain frequencies of electromagnetic radiation to pass through to wireless communication circuitry within handheld device 30 to facilitate wireless communication. The enclosure 32 may also include user input structures 20 through which a user may interface with the device. Each user input structure 20 may be configured to help control a device function when actuated. For example, in a cellular telephone implementation, one or more input structures 20 may be configured to invoke a "home" screen or menu to be displayed, to toggle between a sleep and a wake mode, to silence a ringer for a cell phone application, to increase or decrease a volume output, and so forth.

The display 18 may display a graphical user interface (GUI) that allows a user to interact with the handheld device 30. To this end, the display 18 may be a capacitive touch screen capable of detecting various touch input gestures (e.g., a Multi-Touch™ interface), including multiple simultaneous touch input gestures. Icons of the GUI may be selected via a touch screen included in the display 18, or may be selected by one or more input structures 20, such as a wheel or button. The handheld device 30 also may include various I/O ports 22 that allow connection of the handheld device 30 to external devices. For example, one I/O port 22 may be a port that allows the transmission and reception of data or commands between the handheld device 30 and another electronic device, such as a computer. Such an I/O port 22 may be a proprietary port from Apple Inc. or may be an open standard I/O port. Another I/O port 22 may include a headphone jack to allow a headset 34 with speakers 36 to connect to the handheld device 30. The handheld device 30 also may include one or more integrated speakers 36.

The electronic device 10 of FIG. 1 also may take the form of a compact media player 40. By way of example, the compact media player 40 may be an iPod® by Apple Inc. The compact media player 40 may include a display 18 of a relatively small size (e.g., less than approximately 2 square inches). Like the display 18 of the handheld device 30, the display 18 of the compact media player 40 may be a capacitive touch screen capable of detecting touch input gestures, including multiple simultaneous touch input gestures (e.g., a Multi-Touch™ interface). The compact media player 40 may further include one or more input structures 20, such as an on-off button or a lock button. An I/O interface 22 of the compact media player 40 may enable a headset 34 having speakers 36 to connect to the compact media player 40. Additionally, the I/O interface 22 may enable the compact media player 40 to intercommunicate with another electronic device, such as a desktop or laptop computer.

When the electronic device 10 is playing back media, such as audio, the electronic device 10 may do so in an efficient manner by generally keeping certain clocks of the electronic device running as slow possible without disrupting playback or causing any user-perceptible variation in playback frequency. For example, an audio playback system 50 that may be employed by the electronic device 10 appears in FIG. 4. To play back audio using the audio playback system 50, a portion of an audio file may loaded from storage 16 into an input buffer 52 located in the memory 14. When such audio data is compressed and/or encoded in a format requiring decoding (e.g., AAC, AAC-HE, ALAC, MP3, and so forth), the audio data stored in the input buffer 52 may be sent to a decoder 28.

The decoder 28 may decode the encoded and/or compressed audio data using any suitable techniques. For example, in the audio playback system 50 illustrated FIG. 4, the decoder 28 is a hardware decoder that may unpack compressed audio data into frames of frequency data in the frequency domain before transforming the frames of frequency data into playable decoded audio data in the time domain. However, in other embodiments, such a decoding process may be undertaken wholly or partially by a software decoder component running on the processor(s) 12. For example, in such alternative embodiments, the processor(s) 12 may partially decode the compressed audio data and the hardware decoder 28 may complete the decoding process. Specifically, the processor(s) 12 may unpack some of the compressed audio data into frames of frequency data in the frequency domain. Thereafter, the hardware decoder 28 may transform the frames of frequency data in the frequency domain into audio frames in the time domain.

Optional additional processing of the audio data, such as equalization 54, may occur via a software equalization component 54 running on the processor(s) 12. The processor(s) 12 may additionally undertake other suitable audio post-processing, such increasing or decreasing a playback speed (e.g., half-speed or double speed podcast playback acceleration). As will be discussed below, when the processor(s) 12 perform additional processing via, for example, the equalization component 54, the processor(s) 12 may consume additional processing resources, slowing down the pace at which the audio data transitions from the storage 16 to the input buffer 52 to the decoder 28 and to the optional post-processing such as the equalization component 54. Thus, as discussed below, the current load on the processor(s) 12 may be considered by a clock selection component 62 when selecting a current clock setting 64 of the electronic device 10.

After such optional processing through the processor(s) 12, the decoded audio data may be loaded into an output buffer 56. The output buffer 56 may allow audio data to be added asynchronously from the current pace at which the audio is being played out to a user. That is, although the quantity and/or periodicity by which the output buffer 56 may be loaded may vary, the amount and periodicity of reading out the audio data from the output buffer 56 may be relatively more constant. As should be understood, the output buffer 56 represents a first-in first-out (FIFO) memory buffer structure, and may be a segment of DRAM memory of the memory 14 or a form of SRAM. In some embodiments, the output buffer 56 holds approximately 0.5 s of audio data when full. However, it should be appreciated that the output buffer 56 may hold any suitable amount of data storage.

After the audio data has been read out from the output buffer 56, but before being played out to a user, certain output effects 58 may be added 60 to the audio data. Such output effects 58 may include, for example, voiceover audio indicating track title and artist, other indicator sounds and tones, and so forth. The output effects 58 also may include volume control effects, ducking, output audio analysis, and so forth. Some of these output effects 58 may be added 60 with the audio data from the output buffer 56 before being played aloud on a speaker 36 associated with the electronic device 10.

To conserve power, the audio playback system 50 may not always operate at the highest possible frequency. Although doing so would ensure that the output buffer 56 would remain consistently full, doing so would also unnecessarily consume power, which could significantly reduce the battery life of the power source 26. As such, a clock selection component 62 may select a clock setting for the electronic device 10 from among a number of possible clock settings 64, based on a CPU idle indication 66 from the processor(s) 12, an audio format indication 68, an output buffer fullness indication 70, and/or an output effects indication 74.

Figure 4:
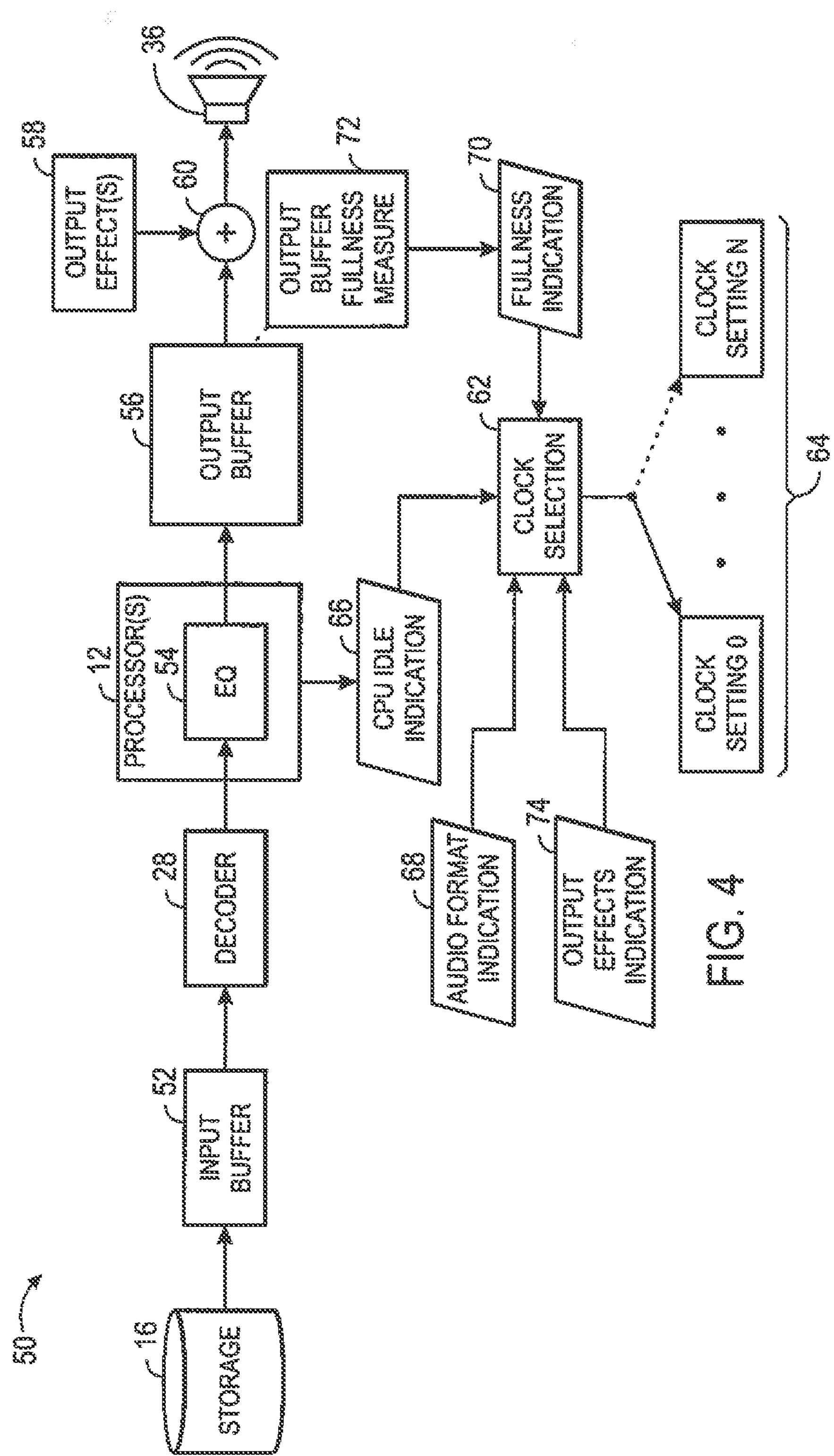
FIG. 4 is a schematic block diagram of an audio playback system incorporating audio-format-based power management, in accordance with an embodiment.

The various clock settings 64 selectable by the clock selection component 62 of the audio playback system 50 of FIG. 4 represent monotonically increasing sets of clock frequencies for operating various components of the electronic device 10. By way of example, in one embodiment, the processor(s) 12 may be capable of being operated at 4 MHz, 8 MHz, 12 MHz, 24 MHz, 66 MHz, and 133 MHz. Each of these clock frequencies, or each of some subset of these clock frequencies, respectively may form one of the clock settings 64. Each clock setting 64 also may include other clock frequencies for operating other components of the electronic device 10 (e.g., the memory 14 and associated buses, the decoder 28, the storage 16, and so forth).

In addition to the clock frequencies that the processor(s) 12 may operate at, other clocks employed by the electronic device 10 may vary as well through the clock settings 64. For example, certain data transfer hardware may operate at various possible clock frequencies, also which may form a component of the clock setting 64. That is, in some embodiments, the lowest clock setting 64, labeled "clock setting 0," may include the lowest feasible clock speeds at which the various components may operate, while the highest clock setting in 64, labeled "clock setting N," may include the highest feasible clock speeds at which the various components may operate.

As noted above, to determine which of the clock settings 64 to apply, the clock selection component 62 may consider the CPU idle indication 66 from the processor(s) 12, the audio format indication 68, the output buffer fullness indication 70, and/or the output effects indication 74. Indeed, in various embodiments, the clock selection component 72 may consider all or a subset of these indications 66, 68, 70, and 74. As will be discussed below, the clock selection component 62 may determine a first target clock setting that depends on the audio format indication 68 and the output buffer fullness indication 70, a second target clock setting that depends on the CPU idle indication 66, and a third target clock setting that depend on the output effects indication 74. The clock selection component 62 then may select as the clock setting 64 the highest of these three target clock settings. Alternatively, the clock selection component 62 may determine only the first target clock setting, the second target clock setting, or the third target clock setting.

The clock selection component 62 may use the CPU idle indication 66 to determine the clock setting 64 that would enable the processor(s) 12 to operate given the current processing load. The processor(s) 12 may periodically provide the clock selection component 62 with the CPU idle indication 66 (e.g., every 100 ms). In general, the clock setting 64 implied by the CPU idle indication 66 only may be applied by the clock selection component 62 when such a clock setting 64 would be higher than another clock setting 64 implied by the audio format indication 68 and the output buffer fullness indication 70 and a clock setting 64 implied by the output effects indication 74.

The clock selection component 62 may use the output effects indication 74 to determine the clock setting 64 that would enable the electronic device 10 to operate given an expected future processing load brought about by soon-to-occur output effects 58. Specifically, the output effects indication 74 may indicate which, if any, output effects 58 are currently being applied or are going to be applied in the near future (e.g., within an amount of time sufficient to slow the audio playback system 50 if the clock settings 64 are not increased). In general, the clock selection component 62 may determine a suitable clock setting 64 given the sum of the expected resources required to perform all of the output effects 58 that are occurring or are expected to occur. Thus, in some embodiments, the clock selection component 62 may select a second of five clock settings 64 when a relatively low-resource-intensity output effect 58 is occurring or is about to occur, where a first of the five clock settings 64 is the lowest and a fifth of the five clock settings 65 is the highest. The clock selection component 62 may select a third of five clock settings 64 when several relatively low-resource-intensity output effects 58 are occurring or are about to occur, or when one relatively resource-intense output effect 58 is occurring or is about to occur. The clock selection component 62 may select a fourth of five clock settings 64 when several relatively resource-intense output effects 58 are occurring or are about to occur, depending on the degree to which the output effects 58 are consuming or are expected to consume processing resources of the electronic device 10. In general, the clock setting 64 implied by the output effects indication 74 only may be applied by the clock selection component 62 when such a clock setting 64 would be higher than another clock setting 64 implied by the audio format indication 68 and the output buffer fullness indication 70 or the CPU idle indication 66.

The clock selection component 62 may use the audio format indication 68 and the output buffer fullness indication 70 to determine the clock setting 64 that would prevent the output buffer 56 from underrunning while conserving power, as indicated by a format-specific clock selection profile. The audio format indication 68 may indicate the particular audio format being decoded and played back, which may include AAC, ALAC, AAC-HE, MP3, and so forth. In addition, an output buffer fullness measurement component 72 may periodically determine the fullness of the output buffer 56 and providing the output buffer fullness indication 70 to the clock selection component 62. The output buffer fullness measurement component 72 may check the fullness of the output buffer 56 each time audio data is written to or read from the output buffer 56, (e.g., approximately every 20 ms). As mentioned above, and as described in greater detail below, the output buffer fullness measurement component 72 may treat the output buffer 56 as being divided into sections separated by one or more thresholds. Thus, in some embodiments, the output buffer fullness measurement component 72 may provide the output buffer fullness indication 70 as a notation of which of the thresholds the fullness of the output buffer 56 has fallen beneath.

As described below, a format-specific clock selection profile may enable the clock selection component 62 to determine from the audio format indication 68 and the output buffer fullness indication 70 a clock setting 64 that would prevent the output buffer 56 from experiencing an underrun while still conserving power. That is, the format-specific clock selection profile relating the audio format indicated by the audio format indication 68 and the current threshold under which the fullness level of the output buffer 56 may indicate which of the clock settings 64 to select. In general, the clock setting 64 implied by the format-specific clock selection profile given the audio format indication 68 and the output buffer fullness indication 70 only may be applied by the clock selection component 62 when such a clock setting 64 would be higher than another clock setting 64 implied by the CPU idle indication 66.

Figures 5, 6:
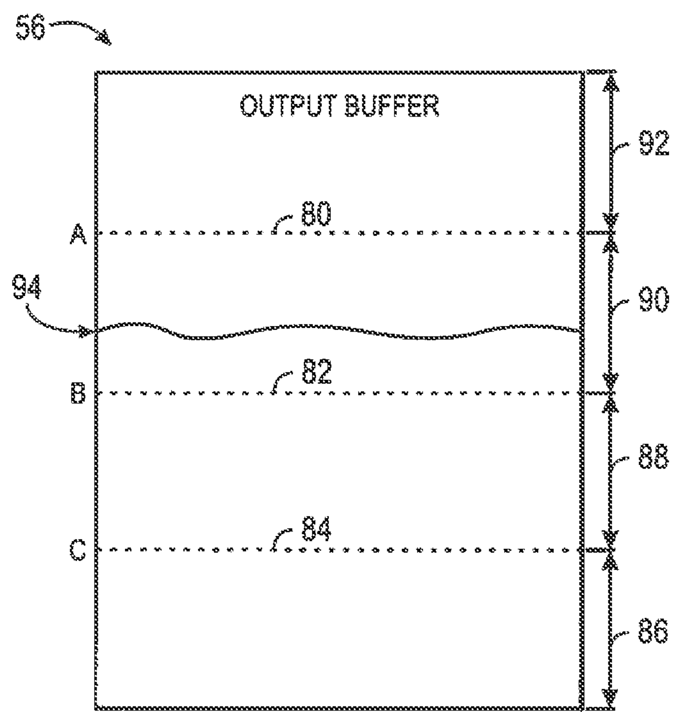
FIG. 5 is a schematic block diagram of an output buffer of the system of FIG. 4, in accordance with an embodiment.
FIG. 6 is a format-specific clock selection profile table for use in the system of FIG. 4, in accordance with an embodiment.

One embodiment of the output buffer 56 is represented schematically in FIG. 5. The output buffer 56 of FIG. 5 may be understood to store audio data such that the least recent data in the output buffer 56 is read out from the bottom of the output buffer 56. As shown in FIG. 5, the output buffer 56 is divided by three thresholds, 80, 82, and 84, respectively labeled A, B, and C. It should be appreciated that other embodiments may include more or fewer thresholds. Also, each of the thresholds is separated by approximately the same amount of data storage in the example of FIG. 5. In other words, the amount of data storage 86 from empty to the third threshold 84 (C), generally may equal the amount of data storage 88 from the third threshold 84 (C) to the second threshold 82 (B), the amount of data storage 90, between the second threshold 82 (B) to the first threshold 80 (A), and the amount of data storage 92 from the first threshold 80 (A) to full. In other embodiments, the amount of data storage 86, 88, 90, and 92 may vary and need not be equal.

As noted above, the audio playback system 50 may fill the output buffer 56 more quickly or more slowly depending on the specific audio format being played back and the clock setting 64 that is currently applied. As the audio data is read out of the output buffer 56, lowering the fullness of the output buffer 56, audio data should continue to replenish the output buffer 56 to prevent underruns. Accordingly, as represented by an example format-specific clock selection profile table 96, which represents various format-specific clock selection profiles 98, the clock selection component 62 may choose a clock setting 64 depending on the current threshold level of fullness in the output buffer 56 and the current audio format being played back. It should be understood that the format-specific clock selection profile table 96 of FIG. 6 is meant to illustrate only one example in which format-specific clock selection profiles 98 may be provided. Moreover, the format-specific clock selection profiles 98 illustrated in FIG. 6 are merely meant to show how various combinations of clock settings 64 may be associated with various of the thresholds of the output buffer 56 depending on the specific audio format being played back.

Using the format-specific clock selection profile table 96 of FIG. 6, the clock selection component 62 may select from among, for example, five distinct clock settings 64. In the format-specific clock selection profile table 96, these are labeled 0-4, and should be understood to be monotonically increasing from clock setting 0 to clock setting 4. When a first audio format is being played back by the audio playback system 50 of FIG. 4, the clock selection component 62 may select from among the clock settings 64 using a first format-specific clock selection profile. Provided by way of example only, such a first format-specific clock selection profile may lead the clock selection component 62 to select a clock setting "2" when the output buffer 56 fullness, as provided by the output buffer fullness indication 70, falls below a threshold level A. When the output buffer fullness indication 70 indicates that the fullness of the output buffer 56 has fallen below the threshold level B, the clock selection component 62 may select the clock setting "3." Finally, when the output buffer fullness indication 70 indicates that the fullness of the output buffer 56 has fallen below the threshold C, the clock selection component 62 may select the clock setting "4" shown in the format-specific clock selection profile table 96.

As represented in FIG. 6, different format-specific clock selection profiles 98 may imply different clock settings at different threshold levels of fullness when different audio formats are being played back. These audio-format-based associations may be chosen such that, for a given audio format, the average clock setting 64 that is applied as the fullness of the output buffer 56 varies is approximately equal to a minimum clock setting needed to prevent buffer under-runs of the output buffer 56. That is, for example, if a given format requires an average of 7 MHz of clock frequency for steady state operation in the audio playback system 50 of FIG. 4, the clock settings for the threshold may vary between 4 MHz and 12 MHz depending on the threshold level of fullness of the output buffer 56.

In one embodiment, format-specific clock selection profiles 98 associated with AAC, MP3, ALAC, way, and aiff formats may indicate a clock setting "0" when the fullness of the output buffer has fallen beneath the threshold A but remains above the threshold B, a clock setting "1" when the fullness of the output buffer has fallen beneath the threshold B but remains above the threshold C, and a clock setting "4" when the fullness of the output buffer has fallen beneath the threshold C. By contrast, a format-specific clock selection profile 98 associated with AAC-HE may indicate a clock setting "2" when the fullness of the output buffer has fallen beneath the threshold A but remains above the threshold B, a clock setting "2" when the fullness of the output buffer has fallen beneath the threshold B but remains above the threshold C, and a clock setting "4" when the fullness of the output buffer has fallen beneath the threshold C.

Figure 7:
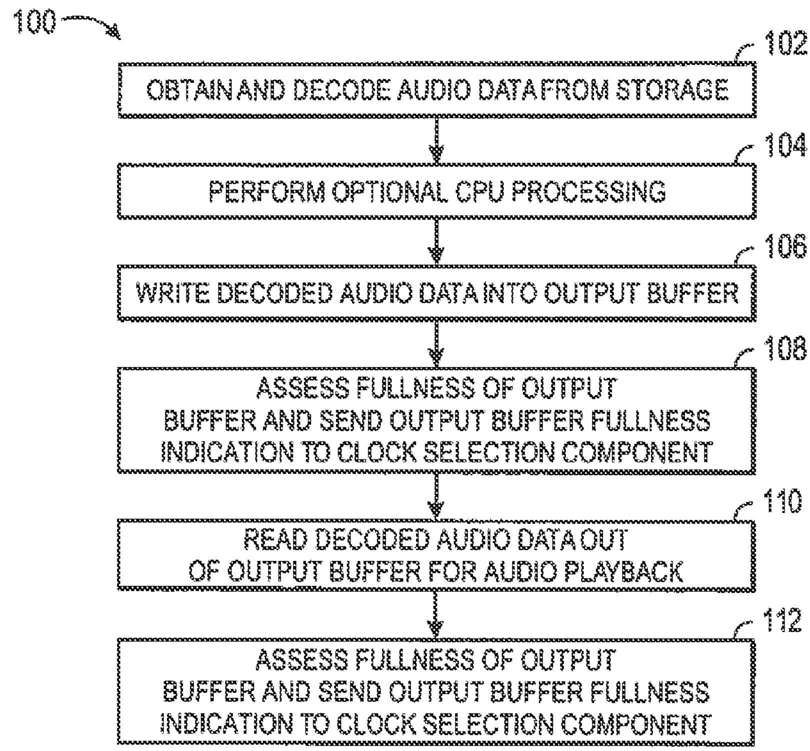
FIG. 7 is a flowchart describing an embodiment of a method for operating the system of FIG. 4.

One manner of operating the audio playback system 50 of FIG. 4 is represented in a flowchart 100 of FIG. 7. The flowchart 100 may begin when audio data is obtained from the storage 16 and decoded using a decoder 28 for the processor(s) 12 (block 102). Optionally, the processor(s) 12 may perform further audio enhancement processing (block 104). By way of example, an equalization component 54 running on the processor(s) 12 may equalize the audio according to a desired equalization setting. The audio data next may be written into the output buffer 56 (block 106). Upon reading the decoded audio data out of the output buffer, the output buffer fullness measurement component 72 may assess the fullness of the output buffer 56 and provide the output buffer fullness indication 70 to the clock selection component 62 (block 108). In some embodiments, the output buffer fullness measurement component 72 may assess the fullness of the output buffer 56 only when audio data is written to the output buffer 56 or only when audio data is read from the output buffer 56.

As mentioned above and as described below, the clock selection component 62 may use such an output buffer fullness indication 70 to select from among a number of clock settings 64, which the clock selection component 62 may apply to one or more clocks of the electronic device 10. Periodically, the data in the output buffer 56 may be read out for playback on the speaker 36 (block 110). When the decoded audio is being read out of the output buffer 56, the output buffer fullness measurement component 72 may again assess the fullness of the output buffer, sending an output buffer fullness indication 70 to the clock selection component 62 (block 112).

Figure 8:
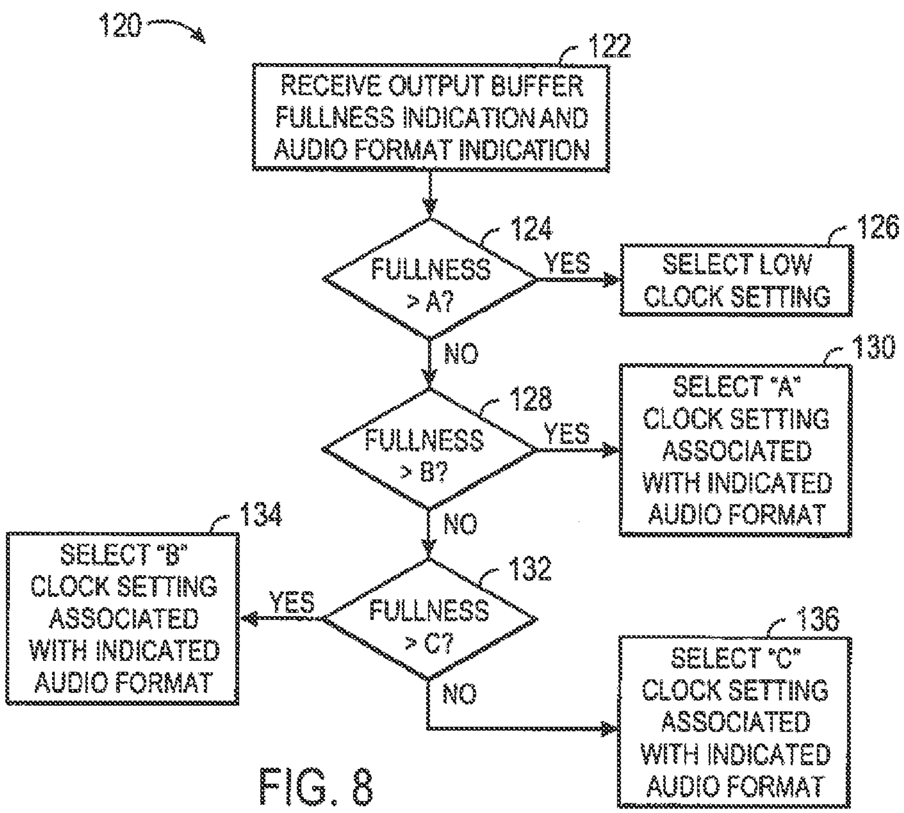
FIG. 8 is a flowchart describing an embodiment of a method for determining a clock setting of the electronic device depending on a fullness of the output buffer of FIG. 5.

One manner in which the clock selection component 62 may choose a clock setting 64 based on such an output buffer fullness indication 70 appears in a flowchart 120 of FIG. 8. The flowchart 120 may begin when the clock selection component 62 has received an audio format indication 68 and an output buffer fullness indication 70 (block 122). If the output buffer fullness indication 70 indicates that the fullness of the output buffer 56 exceeds the threshold level A, the clock selection component 62 may select a low clock setting 64 (e.g., the lowest feasible clock setting 64 at which the electronic device 10 is capable of operating) to allow the output buffer 56 to drain such that the output buffer 56 is not overfilled (block 126).

If the output buffer fullness indication 70 is below the threshold level A (decision block 124), but above the threshold level B (decision block 128), the clock selection component 62 may choose the clock setting 64 indicated by the format-specific clock selection profile 98 associated with the currently playing audio format and threshold level A (block 130). By way of example, when the audio format is "audio format 1," the format-specific clock selection profile illustrated in FIG. 6 may indicate that the clock selection component 62 should select the clock setting "2."

If the output buffer fullness indication 70 is below the threshold level B (decision block 128), but above the threshold level C (decision block 132), the clock selection component 62 may choose the clock setting 64 indicated by the format-specific clock selection profile 98 associated with the currently playing audio format and threshold level B (block 134). By way of example, when the audio format is "audio format 1," the format-specific clock selection profile illustrated in FIG. 6 may indicate that the clock selection component 62 should select the clock setting "3."

If the output buffer fullness indication 70 is below the threshold level C (decision block 132), the clock selection component 62 may choose the clock setting 64 indicated by the format-specific clock selection profile 98 associated with the currently playing audio format and threshold level C (block 134). By way of example, when the audio format is "audio format 1," the format-specific clock selection profile illustrated in FIG. 6 may indicate that the clock selection component 62 should select the clock setting "4."

Figure 9:
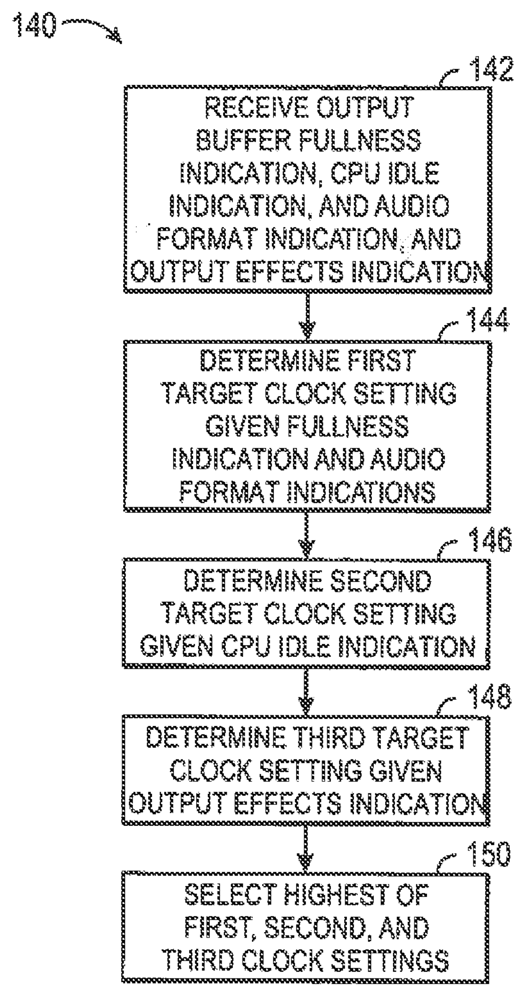
FIG. 9 is a flowchart describing an embodiment of a method for determining an audio-format-based clock setting for a clock of the electronic device.

In some embodiments, the clock selection component 62 also may consider the CPU idle indication 66, which may indicate a minimum clock setting 64 needed by the processor(s) 12. As shown by a flowchart 140 of FIG. 9, the clock selection component 62 may choose the higher clock setting 64 of those implied by the CPU idle indication 66 as well as by the audio format indication 68 and the output buffer fullness indication 70.

The flowchart 140 may begin when the clock selection component 62 has received the output buffer fullness indication 70, the CPU idle indication 66, and the audio format indication 68 (block 142). The clock selection component 62 may determine a first target clock setting 64 that is associated with the audio formal indication 68 and the output buffer fullness indication 70 (block 144). By way of example, the activities of block 144 may occur in the manner described above with reference to the flowchart 120 of FIG. 8.

Additionally, the clock selection component 62 may determine a second target clock setting 64 representing a clock setting 64 associated with the CPU idle indication 66 (block 146) and a third target clock setting 64 representing a clock setting 64 associated with the output effects indication 74 (block 148). The clock selection component 62 may determine these target clock settings 64 using any suitable technique, such as those discussed above. Having determined the first target clock setting 64, the second target clock setting 64, and the third target clock setting 64, the clock selection component 62 ultimately may select the highest of these three target clock settings 64 to prevent the output buffer 56 from underrunning while still conserving power (block 150).

The audio playback system 50 may determine the clock setting 64 to apply to the electronic device 10 in alternative manners. For example, in the embodiment of the audio playback system 50 shown by FIG. 10, the clock selection component 62 may select the clock setting 64 without necessarily being aware of the audio format currently being played back by the audio playback system 50. Indeed, rather than follow a format-specific clock selection profile 98, the clock selection component 62 may select the same clock setting 64 depending on a given output buffer fullness indication 70, regardless of audio format. Instead, the output buffer fullness measurement component 72 may receive the audio format indication 68 and may adjust its assessment of the fullness of the output buffer 56 depending on the current audio format being played back by the electronic device 10. In particular, the output buffer fullness measurement component 72 may treat the output buffer 56 as including different threshold locations depending on the audio format indication 68.

Figure 11:
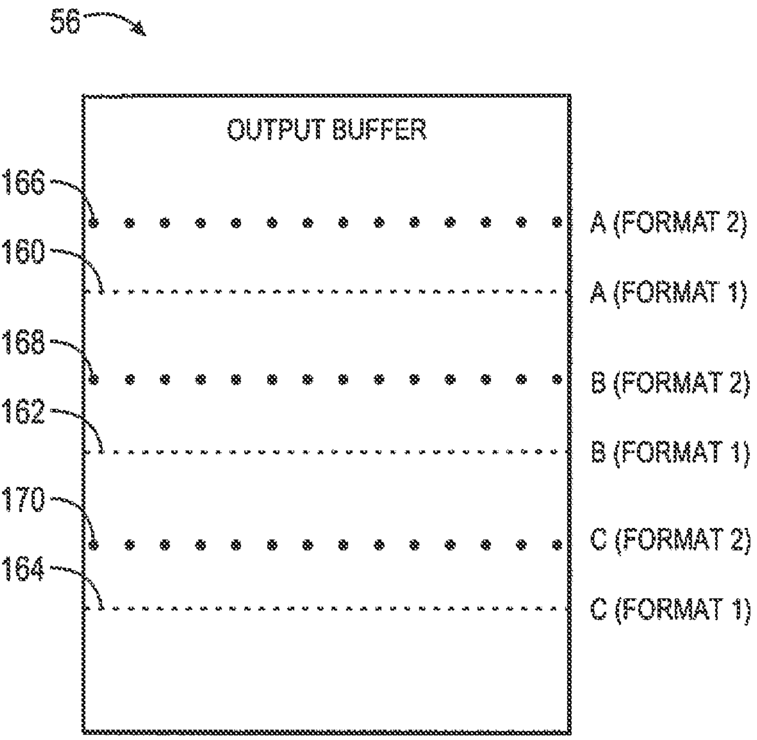
FIG. 11 is a schematic block diagram of the output buffer of the system of FIG. 10, in accordance with an embodiment.

For example, as shown by a schematic block diagram of the output buffer 56 in FIG. 11, the location of a particular threshold of the output buffer 56 may vary depending on the audio format indication 68. Thus, in one embodiment, a first threshold 160 (A), a second threshold 162 (B), and a third threshold 164 (C) may be unique to a first audio format. Different audio formats may imply different threshold locations in the output buffer 56. For example, when the audio format indication 68 represents a second audio format, the output buffer fullness measurement component 72 may treat the output buffer 56 as including a first threshold 166 (A), a second threshold 168 (B), and a third threshold 170 (C). In general, the set of locations of the thresholds A, B, and/or C may be distinct for each audio format. These thresholds may be located in the output buffer 56 such that the clock selection component 62 generally selects a clock setting 64 to achieve a similar improvement in efficiency as would be achieved according to the embodiments previously described above.

Figure 10:
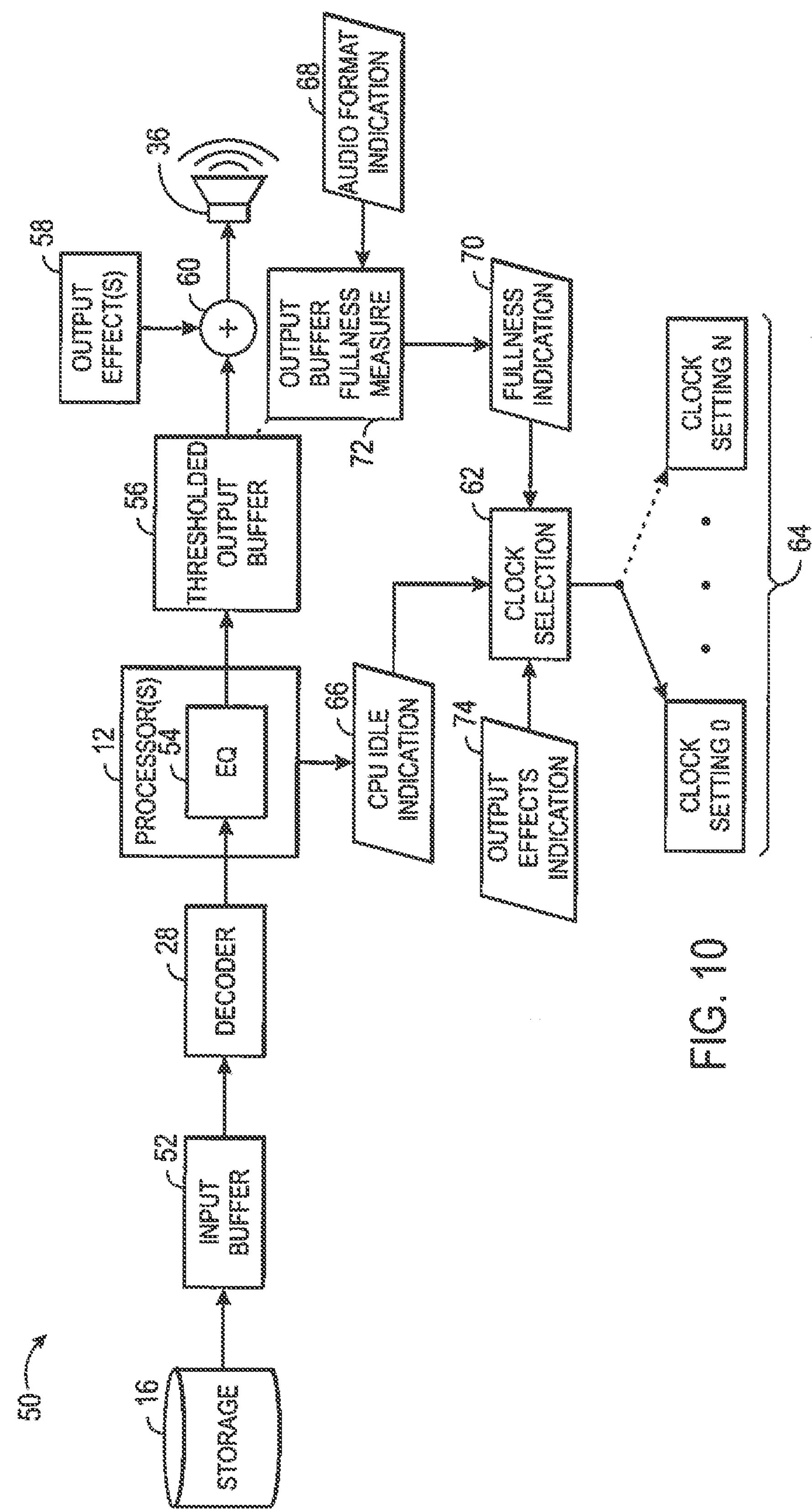
FIG. 10 is a schematic block diagram of another audio playback system incorporating audio-format-based power management, in accordance with an embodiment.
Figure 12:
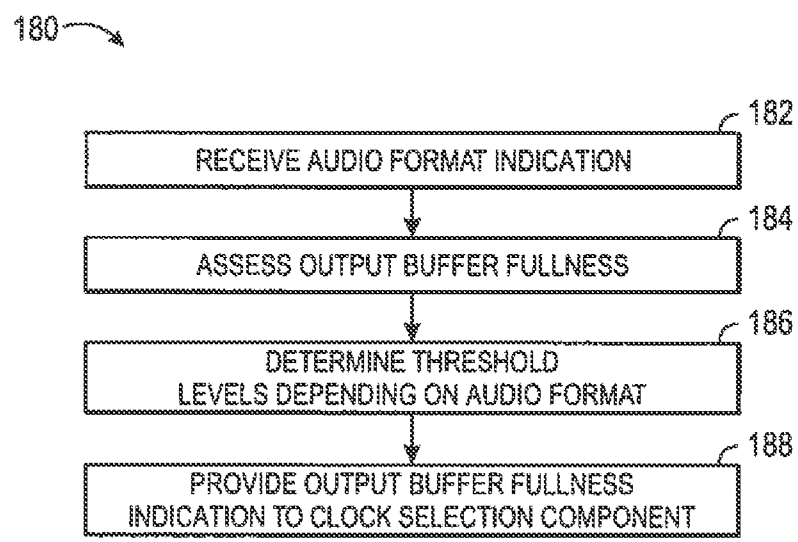
FIG. 12 is a flowchart describing an embodiment of a method for operating the system of FIG. 10.

A flowchart 180 of FIG. 12 represents one manner of assessing the output buffer fullness using the embodiment of the audio playback system 50 of FIG. 10. The flowchart 180 may begin when the output buffer fullness measurement component 72 has received the audio format indication (block 182). When audio data is written to or read from the output buffer 56, the output buffer fullness measurement component 72 may assess the current level of fullness in the output buffer 56 (block 184). Rather than select the same threshold locations within the output buffer 56 regardless of format, the output buffer fullness measurement component 72 may determine the set of threshold levels depending on the audio format indication 68. That is, as discussed above with reference to FIG. 11, the output buffer fullness measurement component 72 may measure the fullness of the output buffer 56 relative to a certain set of thresholds that may be unique to the audio format being played back. In some embodiments, this format-specific set of thresholds may be indicated by a format-specific threshold profile. Finally, the output buffer fullness measurement component 72 may determine the fullness of the output buffer 56 relative to the determined threshold levels (block 188). Such a buffer output fullness indication 70 may be used by the clock selection component 62 for selecting the clock setting 64. Specifically, in some embodiments, given the same output buffer fullness indication 70, the clock selection component 62 may apply the same clock setting 64.

Certain audio formats may fill the output buffer 56 in a highly predictable manner, which may allow for much more aggressive threshold levels. For example, audio received via a radio broadcast (e.g., an FM radio broadcast via the network interface(s) 24) may fill the output buffer 56 more consistently and predictably than decoding audio of other formats. Since such audio may steadily enter and exit the output buffer 56, the likelihood of an underrun occurring during normal operation may decrease as well. As such, the output buffer measurement component 72 may measure the fullness of the output buffer 56 using relatively low thresholds.

Figures 13, 14:
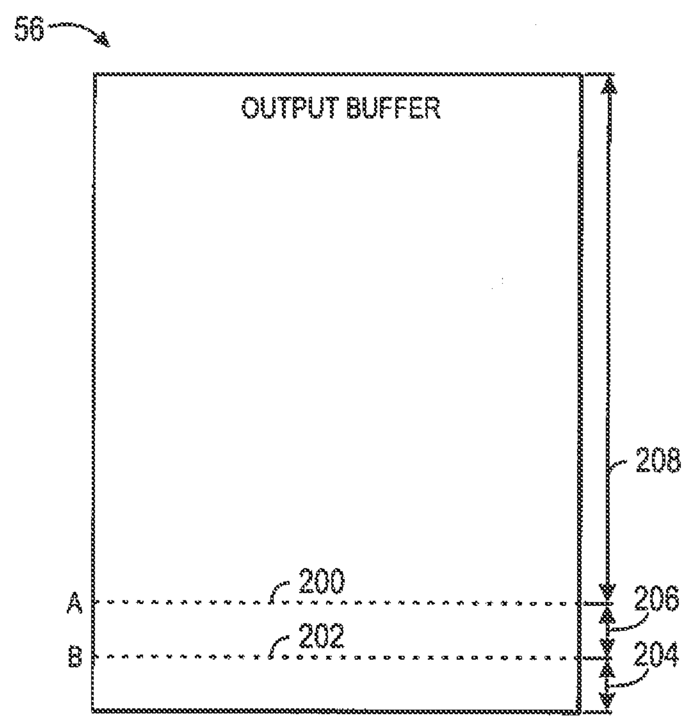
FIG. 13 is another schematic block diagram of the output buffer of the system of FIG. 4, in accordance with an embodiment.
FIG. 14 is format-specific clock selection profile table that may be used with the output buffer of FIG. 13, in accordance with an embodiment.

For example, in the embodiment of the output buffer 56 shown in FIG. 13, the output buffer measurement component 72 may measure the fullness of the output buffer 56 according to a first threshold 200 (A) and a second threshold 202 (B). These thresholds 200 (A) and 202 (B) may be much lower than the first and second thresholds 80 and 82 of the output buffer 56 of FIG. 5. Indeed, the amount of data storage 204 from empty to the second threshold 200 (B) may equal approximately 3.25% of the total data storage of the output buffer 56, when the output buffer 56 holds approximately 0.5 s of audio data when full. The amount of data storage 206 from the second threshold 202 (B) to the first threshold 200 (A) also may equal approximately 3.25% of the total data storage of the output buffer 56, or about 6.5% from empty. In various other embodiments, the data storages 204 and 206 each may include between 1% and 10% of the total data storage of the output buffer 56. The data storage 208 includes the remainder of the data storage of the output buffer 56 from the first threshold 200 (A) to full.

When the audio playback system 50 plays back a particularly reliable and low-resource-intensity format such as FM radio, the clock selection component 62 may apply relatively low clock settings 64 in relation to the thresholds illustrated in FIG. 13. Indeed, as shown by a low-intensity format-specific clock selection profile table 200 of FIG. 14, certain format-specific clock selection profiles 98 also may indicate certain particularly low clock settings 64 at the particularly low thresholds of FIG. 13. That is, as shown by the format-specific clock selection profile 98 of low-intensity format-specific clock selection profile table 200, specifically directed to FM radio audio playback, a clock setting "0" may be indicated when the audio data remains between the threshold A and the threshold B. The format-specific clock selection profile 98 may indicate a clock setting "1" when the audio data falls beneath the threshold B.

The specific embodiments described above have been shown by way of example, and it should be understood that these embodiments may be susceptible to various modifications and alternative forms. Indeed, for example, the embodiments relating to FIGS. 4 and 10 may be combined, such that the threshold locations may vary according to a format-specific threshold profile and that the clock selections for each threshold may vary according to a format-specific clock selection profile. It should be further understood that the claims are not intended to be limited to the particular forms disclosed, but rather to cover all modifications, equivalents, and alternatives falling within the spirit and scope of this disclosure.

What is claimed is:

1. A computer-implemented method comprising:

in a device having a processor and a memory:

filling a buffer in the memory with decoded data generated from data encoded in a format; and responsive to consuming the decoded data from the buffer, varying a clock setting on the device based on the format of the encoded data and any one or more of a fullness of the buffer and an amount of resources requested by the processor, wherein varying the clock setting on the device includes:

mapping one or more format-specific clock settings to thresholds of fullness of the buffer, the one or more format-specific clock settings associated with the format of the encoded data, monitoring a level of fullness of the buffer relative to the thresholds of fullness, and changing the clock setting of the device to the format-specific clock setting mapped to a threshold of fullness that corresponds to the monitored level of fullness.

2. The method of claim 1, further comprising:

comparing an idle-specific clock setting needed to satisfy the amount of resources requested by the processor to the format-specific clock setting mapped to the threshold of fullness that corresponds to the monitored level of fullness; and changing the clock setting of the device to the higher of the compared clock settings.

3. The method of claim 2 wherein the idle-specific clock setting is a minimum clock speed for accommodating enhancing the decoded data prior to filling the buffer.

4. The method of claim 3, wherein the amount of resources requested by the processor is greater when enhancing the decoded data.

5. The method of claim 1, wherein the thresholds of fullness differ depending on the format of encoded data.

6. The method of claim 1, wherein the one or more format-specific clock settings differ depending on the format of the encoded data.

7. The method of claim 1, wherein the one or more format-specific clock settings and thresholds of fullness are stored in a format-specific clock selection profile in the memory of the device.

8. The method of claim 1, wherein the format of the encoded data includes any one or more media formats that compress data, the media formats including any one or more of audio formats and video formats.

9. The method of claim 8, wherein the one or more media formats include any one or more of AAC, ALAC, AAC-HE and MP3 media formats.

10. A device comprising:

a decoder configured to decode encoded data into decoded data;

a memory configured to store the decoded data in a buffer;

data processing circuitry configured to:

measure a fullness of the buffer based on how much decoded data is stored in the buffer, set an operating frequency of any one or more of the memory, the buffer, the decoder, and the data processing circuitry, wherein the operating frequency is set based at least in part on a format of the encoded data and the fullness of the buffer, fill the buffer with decoded data, empty the buffer as the device consumes the decoded data, and set the operating frequency based at least in part on the format of the encoded data and any one or more of the fullness of the buffer and an amount of resources requested by the data processing circuitry; and wherein the data processing circuitry configured to set the operating frequency includes data processing circuitry configured to:

map one or more format-specific clock settings to thresholds of fullness of the buffer, the one or more format-specific clock settings associated with the format of the encoded data;

monitor a level of fullness of the buffer relative to the thresholds of fullness; and change the operating frequency of the device in accordance with the format-specific clock setting mapped to a threshold of fullness that corresponds to the monitored level of fullness.

11. The device of claim 10, wherein the data processing circuitry configured to set the operating frequency further includes data processing circuitry configured to:

compare an idle-specific clock setting needed to satisfy the amount of resources requested by the data processing circuitry to the format-specific clock setting mapped to the threshold of fullness that corresponds to the monitored level of fullness; and change the clock setting of the device to the higher of the compared clock settings.

12. The device of claim 11, wherein the idle-specific clock setting is a minimum clock speed to accommodate enhancing the decoded data prior to filling the buffer.

13. The device of claim 12, wherein the amount of resources requested by the data processing circuitry is greater when enhancing the decoded data.

14. The device of claim 10, wherein the thresholds of fullness differ depending on the format of encoded data.

15. The device of claim 10, wherein the one or more format-specific clock settings differ depending on the format of the encoded data.

16. The device of claim 10, wherein the one or more format-specific clock settings and thresholds of fullness are stored in a format-specific clock selection profile in the memory.

17. The device of claim 10, wherein the format of the encoded data includes any one or more media formats that compress data, the media formats including any one or more of audio formats and video formats, including any one or more of AAC, ALAC, AAC-HE and MP3 media formats.

18. An article of manufacture comprising one or more tangible, machine-readable media having instructions encoded thereon for execution on an electronic device having a processor to perform:

filling a buffer in a memory with decoded data generated from data encoded in a format;

responsive to consuming the decoded data from the buffer, varying a clock setting on the device based on the format of the encoded data and any one or more of a fullness of the buffer and an amount of resources requested by the processor;

wherein to perform varying the clock setting on the electronic device, the processor is to further perform:

mapping one or more format-specific clock settings to thresholds of fullness of the buffer, the one or more format-specific clock settings associated with the format of the encoded data;

monitoring a level of fullness of the buffer relative to the thresholds of fullness; and changing the clock setting of the device to the format-specific clock setting mapped to a threshold of fullness that corresponds to the monitored level of fullness.

19. The article of manufacture of claim 18, wherein the processor is to further perform:

comparing an idle-specific clock setting needed to satisfy the amount of resources requested by the processor to the format-specific clock setting mapped to the threshold of fullness that corresponds to the monitored level of fullness, wherein the idle-specific clock setting is a minimum clock speed for accommodating enhancing the decoded data prior to filling the buffer and the amount of resources requested by the processor is greater when enhancing the decoded data; and changing the clock setting of the device to the higher of the compared clock settings.

20. The article of manufacture of claim 18, wherein:

the thresholds of fullness differ depending on the format of encoded data, the format of the encoded data including any one or more media formats that compress data, the media formats including any one or more of audio formats and video formats, including any one or more of AAC, ALAC, AAC-HE and MP3 media formats; and the one or more format-specific clock settings differ depending on the format of the encoded data, the one or more format-specific clock settings and thresholds of fullness stored in a format-specific clock selection profile in the memory of the device.

* * * * *